No. 697,368. Patented Apr. 8, 1902.
J. W. SHAW.
WASHER FASTENER.
(Application filed Aug. 7, 1901.)
(No Model.)
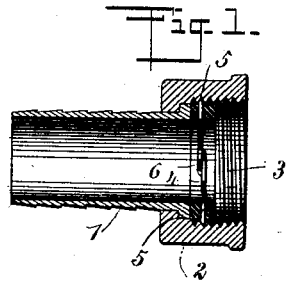
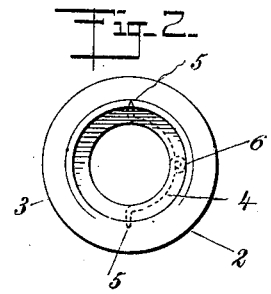
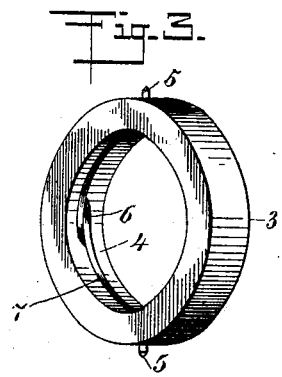
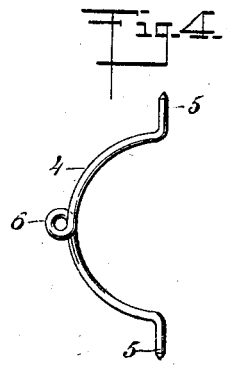
WITNESSES:
INVENTOR.
John W. Shaw
BY
ATTORNEYS
THE NORRIS PETERS CO., PHOTO-LITHO., WASHINGTON, D. C.

UNITED STATES PATENT OFFICE.

JOHN WOOLSEY SHAW, OF BERRYESSA, CALIFORNIA.

WASHER-FASTENER.

SPECIFICATION forming part of Letters Patent No. 697,368, dated April 8, 1902.

Application filed August 7, 1901. Serial No. 71,184. (No model.)

*To all whom it may concern:*

Be it known that I, JOHN WOOLSEY SHAW, a citizen of the United States, and a resident of Berryessa, in the county of Santa Clara and State of California, have invented a new and Improved Washer-Fastener, of which the following is a full, clear, and exact description.

This invention relates to improvements in devices for fastening packing-rings or washers—such, for instance, as washers for hose-couplings or the like; and the object is to provide a simple fastening device that will firmly hold the washer and not interfere with the passing of water through the same.

I will describe a washer-fastener embodying my invention and then point out the novel features in the appended claims.

Reference is to be had to the accompanying drawings, forming a part of this specification, in which similar characters of reference indicate corresponding parts in all the figures.

Figure 1 is a sectional view of a hose-coupling with a washer-holder embodying my invention applied thereto. Fig. 2 is an end view thereof. Fig. 3 is a perspective view of a washer or packing-ring and the fastener, and Fig. 4 is a side view of the fastener.

Referring to the drawings, 1 and 2 designate the members of a hose-coupling, the member 2 being internally threaded to receive the threaded portion of the block on the end of a hose, which is designed to abut against the washer 3. This washer 3 consists of rubber or other suitable flexible material. As a means for holding the washer in place I provide a fastener consisting of a strip of metal—for instance, spring-wire—having a segmental or semicircular body portion 4, terminating at its ends in outwardly-extended points 5, designed to pass through perforations in the wall of the washer, and at the central portion of the body a coil 6 is formed which will add somewhat to the yielding nature of the fastener.

In operation the fastening device is inserted at the inner side of a washer and embedded at its body portion in a channel 7, formed in the washer, so that the inner surface of the fastening device is substantially flush or slightly within the inner surface of the washer, and thus the fastener will not interfere with the passage of water through the washer. The points 5, which extend outward from the washer, are designed to engage in the thread of the coupling-section 2, and by this means the washer is held from displacement or outward movement when the hose is detached from the coupling-section.

A fastening device made in accordance with my invention will be found very cheap to manufacture and is readily inserted.

Having thus described my invention, I claim as new and desire to secure by Letters Patent—

1. A fastening device for a packing-ring or washer, comprising a segmental strip of metal having outwardly-turned ends designed to pass through the packing-ring or washer from the inner to the outer sides and projecting beyond the outer side, substantially as specified.

2. The combination with a washer having a channel formed in its interior surface, of a fastener comprising a strip of resilient metal having a segmental body portion terminating in outwardly-extended ends, the said body portion being designed to be inserted in the channel of the washer, substantially as specified.

3. The combination with a washer having an annularly-disposed channel formed in its inner wall, of a fastener having a body portion adapted to be seated in said channel, a coil arranged in said body portion, and ends extended outward from the body portion and designed to pass through the washer material.

4. In combination with a washer, a fastener consisting of a strip of metal arranged wholly within the washer and having its ends turned outward and passed through the washer, substantially as specified.

5. In combination with a washer, a fastener consisting of a segmental strip of resilient metal embraced wholly within the circumference of the washer and having outwardly-turned ends projecting from the outer side thereof, substantially as specified.

In testimony whereof I have signed my name to this specification in the presence of two subscribing witnesses.

JOHN WOOLSEY SHAW.

Witnesses:
JAMES P. SEX,
GEO. C. ROWE.